Sept. 17, 1935. P. S. MORGAN 2,014,691
LIQUID FLOW INDICATOR
Filed Nov. 14, 1932
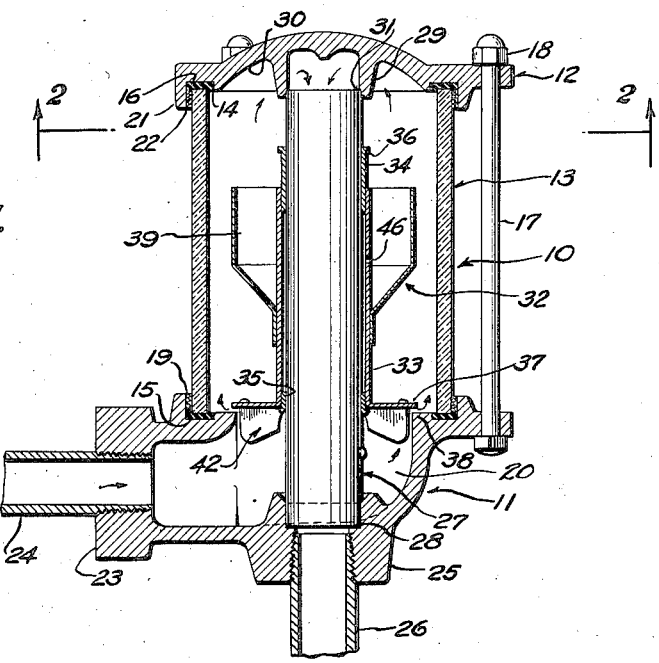
Fig. 1.
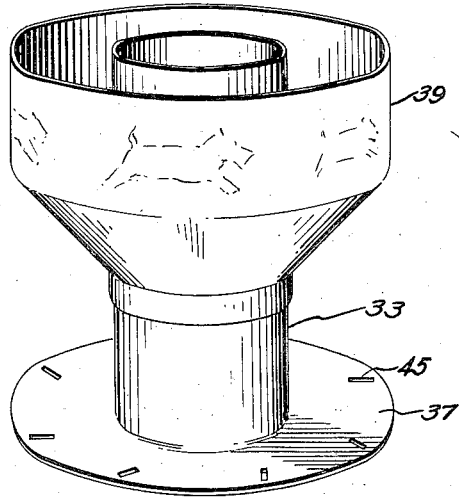
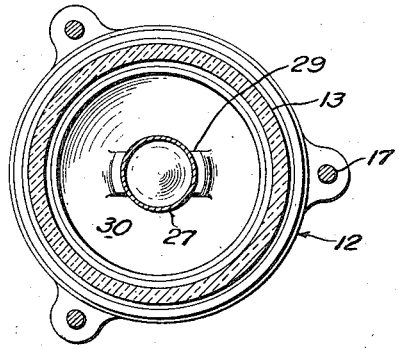
Fig. 2.
Fig. 3.
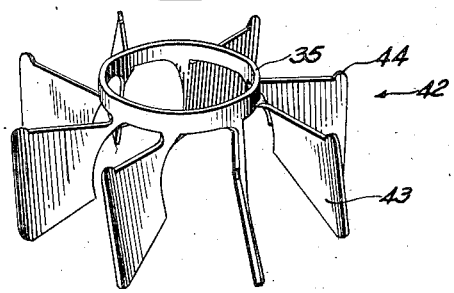
Inventor
Porter S. Morgan
By Albert R. Henry
Attorney Patented Sept. 17, 1935

2,014,691

UNITED STATES PATENT OFFICE 2,014,691

LIQUID FLOW INDICATOR

Porter S. Morgan, Norwalk, Conn., assignor, by mesne assignments, to Liberty Share Corporation, Buffalo, N. Y., a corporation of New York Application November 14, 1932, Serial No. 642,573

5 Claims. (Cl. 116—117)

This invention relates to improvements in liquid flow indicating devices.

Referring particularly to the metering and dispensing of gasoline, the present type of equipment usually consists of motor driven pumps, which have been found more practical than the well known "visible" types of dispensers. In the present dispensers, however, due to the occasional presence of air in the gasoline, the purchaser is often deprived of a full measure of gasoline, since the meter impartially measures both air and gasoline volumes. It has heretofore been proposed to interpose visible indicators in the dispenser output line to indicate the presence or absence of liquid flow and also to make it possible for the purchaser to observe the presence of air bubbles in the gasoline. These devices have been found to be inadequate, as they were not sufficiently sensitive to operate at all points in the wide flow range obtainable in modern dispensing equipment.

The present invention therefore comprehends a sensitive flow indicating instrumentality including a rotor which is positioned for movement in a portion of the liquid stream having a relatively high velocity at all rates of flow. This object is attained by means of a valve device, which at all rates of flow is actuated to lift the rotor and accompanying parts. This lifting action imparts to the rotor a turning movement and additionally the valve restricts and directs a stream of liquid at a relatively high velocity directly through the rotor. This insures the actuation of the rotor whenever the valve is lifted by the fluid stream, and, in such event, the rotation of the rotor is assured, regardless of the rate of flow.

The device is also constructed with a view to ease of assembly, economy, and adaptability to mass production, as is more fully set forth in the accompanying specification and drawing, wherein:

Fig. 1 is a vertical section through the indicating device.

Fig. 2 is a cross section on the line 2—2 of Fig. 1.

Fig. 3 is a perspective view showing the rotor and indicating device in disassembled relation.

The indicating device is contained within a housing 10 which is generally formed of a lower head 11, an upper head 12, and a cylindrical glass tube 13 interposed therebetween. Fluid tight joints are provided between the component parts of the housing by means of gaskets 14 mounted in annular grooves 15 and 16 formed in the faces of the heads 11 and 12 respectively. As shown in Fig. 1, the ends of the glass cylinder 13 are brought into tight engagement with the gaskets by means of connecting bolts 17 which extend through suitable lugs on the heads 11 and 12 and which are drawn up by means of nuts 18. Concentricity of the glass 13 and heads 11 and 12 is maintained by means of flanges 19 and 21, formed on the heads 11 and 12 respectively, and engaging about the ends of the glass 13. The glass is protected from direct contact with the metal by means of felt spacers 22.

With special reference to the indicator device hereinafter described, the housing may be connected in a gasoline or other liquid circuit in any manner suitable to direct the stream in a unidirectional movement through the glass. However, it is preferred that the fluid connections be located in the lower head 11, which is formed with both inlet and outlet passages for the device, 20 having a fitting 23 for receiving an input conduit 24 and a fitting 25 for receiving an output conduit 26. The output conduit 26 is, in effect, projected in spaced relation to the upper head 12 by means of an extension or standpipe 27. This pipe is mounted axially relative to the glass 13 by means of a socket portion 28 formed in the lower head and adapted to receive slidably the lower end of the pipe 27, and a pair of opposed depending lugs 29 formed on the upper head 12. As shown in Fig. 2, the lugs engage over the upper end of the pipe 27 and are shouldered as indicated by the numeral 31 to retain the pipe against upward movement. The head 12 is also formed with a curved dome 30 which is suitably proportioned to direct the fluid stream in a central and return course into the pipe 27.

The standpipe 27 is utilized to provide a mounting means for the indicating device 32. This device includes a fluid motor, a valve and a display portion which may be formed as a unitary structure, or preferably a fabricated structure as shown, for ease of production and lightness. A sleeve 33 positioned substantially within the confines of the glass 13 provides in effect a frame for the device, and it is mounted for rotating axial sliding movement relative to the pipe 27 by means of bearings 34 and 35, the former bearing being secured to the pipe 27 and having a stop shoulder 36 at its upper extremity, and the bearing 35 being secured to the sleeve 33 as hereinafter described. The lower extremity of the sleeve is formed with a radial flange 37 which provides a valve adapted to seat on an annular seat portion 38 formed in the input chamber 20 of the lower head 11. The upper extremity of the sleeve 33 carries a display portion arranged in visual position relative to the glass 13. This portion may be of any shape or form calculated to attract the notice of the observer and is herein shown as a cone-shaped member having a cylindrical portion 39 upon which are placed suitable indicia for indicating clearly the movement of the device.

The means for operating the device 32 comprises a liquid motor or a rotor 42 (Fig. 3) which is conveniently formed as part of the bearing 35. The vanes 43 of the rotor are positioned within the confines of the seat 38 immediately adjacent the valve 37, so that fluid flowing between the seat and valve impinges itself upon the vanes at a relatively high rate of velocity. The vanes 43 are initially formed out of a radial flange of the bearing 35 and are arranged in a substantially tangential relation to the bearing. Additionally, the vanes are curved generally outward and are thus angular or curved in two directions relative to the axis of the bearing 35. The upper edges of the vanes are formed with projecting lugs 44 which are adapted to enter corresponding slots 45 formed in the valve 37 to provide a means for securing the outer ends of the vanes. The bearing 35 is secured to the sleeve 33 by soldering or the like to provide a substantially integral structure. The sleeve 33 is provided with a vent 46 for the escape or entry of liquid during the axial movement of the indicating unit.

In operation, the fluid emerging from the input conduit 24 enters the confines of the input chamber 20 and lifts the valve 37 from its seat 38, which lifting action is resisted by the weight of the entire indicator unit. The rate of flow of the liquid affects the positioning of the valve 37, as obviously during slow flow periods, the valve will lift only sufficiently to allow the requisite volume into the chamber of the housing. Similarly, during normal flow conditions the valve 37 will be sufficiently spaced from its seat to permit full discharge into the housing.

During the above described lifting action, the liquid engaging the face of the valve is directed radially through the valve opening in a tubular stream, and the back pressure induced on this portion of the stream by the weight of the indicating unit restricts the escape area, thus causing an increase in the velocity of this portion of the liquid stream. The rotor 42 is positioned immediately under the valve and thus is subjected to the force of the radially moving liquid at all rates of flow of liquid through the device. The vanes 43 of the rotor, being positioned at an angle to the radial lines, are properly positioned to react to the radially directed portions of the fluid stream, while the depending portions of the vanes are engaged by the vertically moving portions of the stream, and, being angular, also receive a rotational impulse. The rotor is thus responsive at substantially all rates of flow, and carries with it the display portion 39 which is rotated in full view of the observer through the glass 13.

The liquid passing upward through the glass 13 is finally directed to the dome portion 30 of the upper head 12, and is directed centrally to the open end of the standpipe 27, whence it passes into the output conduit 26. During this passage, any small air volumes carried with the liquid will be visible in transit through the glass 13, and will finally be induced into the pipe 27. An accumulation of air about the dome 30 is not possible under the circumstances, as the liquid is forced centrally to the pipe opening at a sufficient velocity to sweep the dome of air volumes.

The device is also non-responsive to air or other gases, as the rotor is proportioned so that air passes therethrough readily. Thus, in the presence of excessive air volumes in the conduits, the valve will lift and give an indication that a circuit is present in the system, yet the display portion will not rotate.

It will also be observed that during rapidly fluctuating pressure conditions in the stream, the indicator will be retained against violent axial movement by the dash pot action of the pocket of liquid between the stationary bearing 34 and the moving bearing 35, wherein the liquid input and output into such pocket will be throttled by the restricted opening 46. This is also effective against violent valving action in the output conduit 26.

It will be obvious that the proportions and structure of the invention will be affected by various factors such as the viscosity of the liquid medium, and the pressure ranges, and therefore it is not intended that the described embodiment be limited to the precise structure illustrated.

I claim:

1. In a liquid flow indicator, a housing having a transparent portion, input and output conduits communicating with spaced portions within said housing, a valve seat in the housing adjacent the input conduit, a valve gravitationally retained on said seat and adapted to open with the fluid stream, means in the housing for mounting said valve for both rotating and axial movement, and a rotor carried by the valve and positioned within said seat, said valve having an extension serving as an indicating device and visible through the transparent portion of the housing.

2. In a liquid flow indicator, a housing having a transparent portion, input and output conduits communicating with spaced portions within said housing, a valve seat in the housing adjacent the input conduit, a valve gravitationally retained on the seat and adapted to open with the liquid stream, means in the housing for mounting the valve for both rotating and axial movement, a rotor carried by the valve and positioned within said seat, said valve having an extension serving as an indicating device and visible through the transparent portion of the housing, and dash pot means on the valve for resisting violent action thereof.

3. In a liquid flow indicator, a housing having a transparent portion, input and output conduits communicating with spaced portions within said housing, a rotor positioned axially relative to the housing and mounted for rotating movement, and means in the housing for directing the liquid in a restricted tubular stream through said rotor, said means being responsive to the velocity of the fluid stream and movable to enlarge the effective area of the liquid stream through the rotor.

4. A liquid flow indicator comprising a housing having a lower head, an upper head and a cylindrical transparent portion interposed therebetween, liquid input and output conduits on the lower head communicating with the interior of the housing, said output conduit having a removable extension terminating in spaced relation to the upper head, means on the upper and lower heads for retaining said extension in concentric relation with said transparent portion, a rotor, and means on said extension for mounting said rotor for rotation relative thereto.

5. A liquid flow indicator comprising a substantially cylindrical housing having a transparent portion, a liquid input conduit leading into one end of the housing, a valve seat in the housing and disposed adjacent the input conduit, a valve engageable with the seat, means in the housing for mounting the valve for both axial and rotating movement, said valve being adapted to be lifted from the seat by the liquid stream entering the input conduit, a rotor on the valve adapted to be engaged by the liquid to rotate the valve when in unseated position, and an output conduit entering said housing at a point spaced from said valve seat.

PORTER S. MORGAN.